Nov. 5, 1957 J. STOLK 2,812,433
PLURAL BAND FREQUENCY CONVERTER WITH INTERMEDIATE FREQUENCY TRAPPING MEANS
Filed Jan. 2, 1953
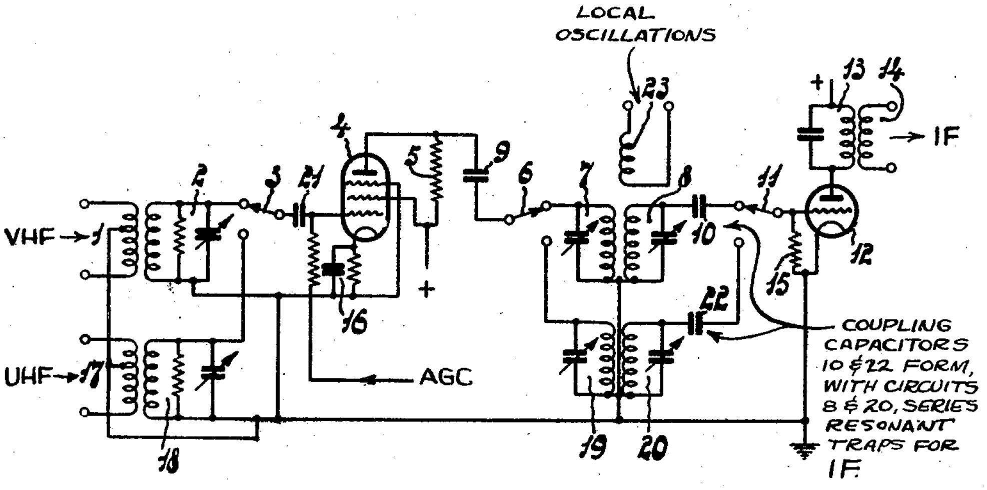
INVENTOR
JAN STOLK
BY Fred M Vogel
AGENT United States Patent Office 2,812,433

Patented Nov. 5, 1957

2,812,433

PLURAL BAND FREQUENCY CONVERTER WITH INTERMEDIATE FREQUENCY TRAPPING MEANS

Jan Stolk, Eindhoven, Netherlands, assignor, by mesne assignments, to North American Philips Company, Inc., New York, N. Y., a corporation of Delaware Application January 2, 1953, Serial No. 329,312

Claims priority, application Netherlands January 21, 1952

3 Claims. (Cl. 250—20)

The invention relates to a circuit-arrangement for frequency conversion of oscillations, more particularly, ultra-high-frequency oscillations, received by a radio-receiving apparatus.

For the reception of ultra-high-frequency oscillations, for example, oscillations in the range of 60 to 200 megacycles per second, the conversion of these oscillations into intermediate-frequency oscillations, the frequency of which may, for example, be of the order of 25 megacycles per second is preferably carried out with the use of a triode, at the grid of which not only the incoming oscillations but also locally produced oscillations are operative, the intermediate-frequency oscillations being derived from the anode thereof. The use of a triode for this purpose has the advantage that the degree of noise is smaller than with the use of a multi-grid tube.

The amplified signal voltage at the grid of the mixing tube produces a variation of the anode current, due to detection in the mixing tube itself, so that the anode current is a measure of the strength of the signal. This may be utilized for control of the signal.

In triodes, however, the capacity between the anode and the grid has a comparatively high value and it has been found that the reaction thus produced by the intermediate-frequency oscillation on the grid circuit may have an unwanted effect. Thus, for example, the characteristic curve of the medium-frequency bandpass filter used in these circuit-arrangements has a shape differing from the desired shape and the form of the real characteristic curve of passage between the aerial terminals and the grid of the mixing tube differs from that measured by detection in the mixing tube itself. All these effects are the stronger, the higher is the conversion amplification which may be obtained in the anode circuit by raising the impedance of the intermediate-frequency circuit.

The invention has for its object to provide a circuit-arrangement in which this disadvantage is mitigated to an appreciable extent.

The invention relates to frequency-changing of high-frequency incoming oscillations, more particularly, ultra-high-frequency oscillations, to intermediate-frequency oscillations in a circuit arrangement consisting of a triode, which is used as a mixer, to which is fed at the grid the incoming oscillations through a grid capacitor and from which is derived at the anode the frequency oscillations. In accordance with the invention an inductor is connected between the electrode of the grid capacitor which is not connected to the grid of the mixer and a point of constant potential, the capacitor and the inductor being proportioned such that the series combination is tuned substantially to the intermediate-frequency carrier oscillation.

It may be noted that various circuit-arrangements are known in which an unwanted frequency is eliminated by means of a series circuit. It is known, for example, to suppress in this manner the so-called image frequencies in the input circuit of a superheterodyne receiver and the local-oscillator frequency in the aerial circuit.

For carrying out the invention use may be made of the elements already provided. Since the incoming oscillations to be changed in frequency are also fed to the inductor, this inductor and a capacitor, preferably a variable capacitor, may constitute a circuit tuned to the frequency to be received. If the local oscillations are produced by a separate oscillator, they may also be supplied, for example, inductively, to this tuned circuit. The invention has been found to be of particular use for television receivers intended for reception in various ranges, each of which comprises a plurality of receiving channels. The tuning may be performed in this case by means of tuning capacitors to the various channels in each of the ranges, the various high-frequency oscillations being replaced by others by means of a change-over device, when going over from the reception in one range to that in another. Simultaneously with the change-over of the circuits the grid capacitor for the grid of the mixer is also replaced by another in a manner such that the series circuit connected between the grid of the mixer and the point of constant potential is tuned, in both cases, to the medium frequency.

In order that the invention may be readily carried into effect, it will now be described in detail with reference to the accompanying drawing, in which the single figure is a schematic diagram of those parts of the circuit-arrangement of a television receiver, having two receiving ranges, required for good understanding of the invention.

In the figure, it is assumed that the oscillations associated with the first range are supplied to the terminals 1. This range may, for example, extend from 54 to 88 megacycles per second and contain a plurality of television channels. The incoming oscillations are supplied through a circuit 2 having a wide tuning range and the arm 3 of a multipolar change-over switch to the first grid of an amplifying tube 4, shown in the form of a pentode. The cathode lead of this tube may include the conventional parallel combination 16 of a resistor and a capacitor for producing the required negative grid bias voltage. Moreover, a voltage for automatic gain control may be supplied, through a resistor, to the grid of the said tube, which is separated, for direct currents, by means of a grid capacitor 21, from the input circuit 2. By means of a variable capacitor, the circuit 2 may be tuned to the central frequencies of the various channels.

The coupling resistor 5 is provided between the anode of the tube 4 and the positive terminal of the voltage supply. The amplified high-frequency oscillations occurring across this resistor are supplied through the capacitor 9 and a second arm 6 of the said change-over switch to a high-frequency circuit 7, which is also tunable with the aid of a variable capacitor. This circuit is coupled inductively with a circuit 8, tunable in a similar manner, and constitutes herewith a high-frequency bandpass filter. The variable capacitors of the circuits 2, 7 and 8 may be coupled mechanically in known manner with one another and with the capacitor of the circuit of the local oscillator. The oscillations across the circuit 8 are supplied through the grid capacitor 10 and a third arm 11 of the change-over switch to the grid of the triode 12, serving as a mixer. The grid of this tube is connected directly to the cathode via the leak resistor 15. The oscillations occurring in a local oscillator (not shown) may be supplied by means of a coil 23 to the input circuit of the mixer 12. The intermediate-frequency oscillations, occurring across the circuit 13, may be derived from the circuit 14.

In order to avoid the unwanted reaction of the intermediate-frequency output circuit on the high-frequency input circuit of the tube 12, according to the invention, the capacitor 10 is proportioned such that series resonance with the circuit 8 for the medium-frequency oscillations occurs between the grid of the tube 12 and ground.

The drawing shows, furthermore, the various circuit elements required for the reception of a higher frequency range, for example, the frequency range between 174 and 216 megacycles per second. This range may also comprise a plurality of television channels. At the reception of this range the incoming oscillations occur between the terminals 17. The switch arms 3, 6 and 11 in the drawing then take up their lower positions. In the input circuit of the high-frequency amplifying tube 4 the circuit 2 is replaced by the wide tuning circuit 18, tunable to a frequency in the higher frequency range. The high-frequency bandpass filter between the output circuit of the tube 4 and the input circuit of the tube 12 is now constituted by the inter-coupled circuits 19 and 20. The high-frequency oscillations amplified in the tube 4 are supplied again through capacitor 9, to the circuit 19. That end of the circuit 20, which is not connected to ground, is connected through the capacitor 22 to the grid of the tube 12. In both cases the intermediate-frequency is the same, for example, of the order of 25 megacycles per second. The capacitors of the circuits 18, 19 and 20 may be connected mechanically with one another and with the capacitor of the oscillatory circuit. The capacitor 22 and the circuit 20 constitute again a series circuit tuned to the intermediate-frequency, so that the occurrence of the medium-frequency oscillations at the grid of tube 12 is avoided. Since the inductance of the circuit at the reception of oscillations in the higher range will have to be considerably lower than at the reception of oscillations in the lower range, the capacity of the capacitor 22 will have to be considerably higher than that of the capacitor 10. Satisfactory results will, for example, be obtainable, if the capacity of the capacitor 10 is about 100 micromicrofarads and that of the capacitor 22 is about 700 micromicrofarads.

The presence of the variable capacitor in the circuit 20 has little effect on the tuning to series resonance.

While I have thus described my invention with specific examples and embodiments thereof, other modifications will be readily apparent to those skilled in the art without departing from the spirit and the scope of the invention as defined in the appended claims.

What I claim is:

1. A circuit arrangement for mixing a high frequency input wave with local oscillations to produce an intermediate frequency output wave, comprising an electron discharge tube having an anode, a cathode and a grid, means coupled to said anode for deriving said intermediate frequency output wave therefrom, means connecting said cathode to a point at constant potential, means for supplying said local oscillations to said grid, a plurality of series resonant circuit arrangements each tuned to the frequency of said intermediate frequency output wave and comprising a capacitor having a capacitance determined by a predetermined band of frequencies of said input wave and a parallel resonant circuit tunable within said predetermined band of frequencies of said input wave comprising an inductor connected in series between said capacitor and said point at constant potential, and means for selectively applying an input wave having a frequency in one of said predetermined bands of frequencies to said grid through the series resonant circuit arrangement comprising the parallel resonant circuit tunable within the band of frequencies of said input wave.

2. A circuit arrangement as claimed in claim 1, wherein a capacitor in a series resonant circuit arrangement comprising a parallel resonant circuit tunable within a band of higher frequencies has a higher capacitance than that of a capacitor in a series resonant circuit arrangement comprising a parallel resonant circuit tunable within a band of relatively lower frequencies.

3. A circuit arrangement as claimed in claim 1, wherein each said parallel resonant circuit further comprises a capacitor connected in parallel across each said inductor.

References Cited in the file of this patent

UNITED STATES PATENTS

| | | |
|---|---|---|
| 1,757,325 | Michelssen | May 6, 1930 |
| 2,141,756 | Linsell | Dec. 27, 1938 |
| 2,215,775 | Banfield | Sept. 24, 1940 |
| 2,261,778 | Reid | Nov. 4, 1941 |
| 2,278,030 | Weber | Mar. 31, 1942 |
| 2,512,481 | Cohen | June 30, 1950 |
| 2,516,272 | Thompson | July 25, 1950 |

FOREIGN PATENTS

| | | |
|---|---|---|
| 174,230 | Switzerland | Mar. 16, 1935 |